United States Patent [19]

Hall

[11] 4,338,565

[45] Jul. 6, 1982

[54] METHOD AND APPARATUS FOR MEASURING THE MOVEMENT OF A SPIRAL WOUND WIRE ROPE

[75] Inventor: Ronald A. Hall, Sacramento, Calif.

[73] Assignee: Exploration Logging, Inc., Sacramento, Calif.

[21] Appl. No.: 168,167

[22] Filed: Jul. 11, 1980

[51] Int. Cl.³ .............................................. G01B 7/04
[52] U.S. Cl. ..................................... 324/206; 33/127; 73/158
[58] Field of Search ............... 324/206; 33/126.5, 127; 73/151–155, 158

[56] References Cited

U.S. PATENT DOCUMENTS

| | | | |
|---|---|---|---|
| 2,466,251 | 4/1949 | Martin | 324/206 |
| 2,655,633 | 10/1953 | Minor et al. | 324/206 |
| 3,039,391 | 6/1962 | Lofthus | 324/206 |
| 3,566,478 | 3/1971 | Hurlston | 324/206 |
| 3,978,588 | 9/1976 | Richardson et al. | 33/126.5 |

FOREIGN PATENT DOCUMENTS

| | | | |
|---|---|---|---|
| 55-1534 | 1/1980 | Japan | 324/206 |
| 55-48602 | 4/1980 | Japan | 73/158 |
| 191136 | 3/1967 | U.S.S.R. | 324/206 |

*Primary Examiner*—Donald O. Woodiel
*Attorney, Agent, or Firm*—Christie, Parker & Hale

[57] ABSTRACT

In an apparatus for measuring equipment depth in a well, the movement of wire rope used to raise and lower the equipment is measured by proximity sensors located adjacent the wire rope and spaced along the direction of movement of the wire rope. The signals from the proximity sensors caused by the spiral windings of the wire rope are employed to determine the length and direction of movement of the wire rope. The invention may be employed to measure movement of wire rope in other applications, such as in elevators or with cages in mine shafts that are supported by wire rope.

11 Claims, 22 Drawing Figures

METHOD AND APPARATUS FOR MEASURING THE MOVEMENT OF A SPIRAL WOUND WIRE ROPE

BACKGROUND OF THE INVENTION

1. Field of the Invention

This invention relates to a method and apparatus for measuring the movement of a spiral wound wire rope during well operations using a non-contacting means in order to determine the depth in a well of equipment supported by the wire rope. The invention may be employed to measure movement of wire rope in other applications, such as in elevators or with cages in mine shafts that are supported by wire rope.

2. Prior Art

The accurate measurement of equipment depth in a well is of major importance, and various arrangements have been employed to effect such measurement.

Some arrangements sense the rotation of the crownwheel on the derrick and thereby provide an indication of the longitudinal movement of the wire rope which actuates the kelly and the drill stem. Such arrangements require installation and maintenance work at the top of the derrick which may be dangerous, especially in bad weather or on floating drill rigs. Such arrangements suffer the disadvantage of inaccuracies introduced by slippage of the wire rope on the crownwheel or by slippage of a mechanical wheel employed to sense movement of the crownwheel.

Another arrangement measures the rotation of the drum of the drawworks and the layers of the wire rope that are spooled on the drum to measure longitudinal movement of the wire rope. Such an arrangement is rather complex, and it is not convenient for use in well logging because well logging techniques require self contained apparatus that can be readily applied to a drilling rig and that can be moved from one drilling rig to another.

Still another arrangement measures the incremental movement of the kelly by apparatus mounted at the top of the kelly. Such an arrangement is subject to considerable vibration and shock due to the movements of the kelly. It is difficult to service particularly during the drilling operation.

SUMMARY OF THE INVENTION

The aforesaid disadvantages are overcome in the present invention by directly measuring the movement of the wire rope used to raise and lower the equipment. The movement of the wire rope is measured by proximity sensors that are located adjacent the wire rope and spaced predetermined distances along the direction of movement of the wire rope. The signals from the proximity sensors caused by the spiral windings of the wire rope are employed to determine the length and direction of movement of the wire rope. In a preferred embodiment for use with well rigs, the measurement of the movement of the wire rope is at a location between the drawworks and the derrick. However, it will be apparent that the measurement apparatus may be located at other positions along the wire rope.

Preferably, three proximity sensors are employed to produce two pairs of electric signals, the amplitudes of which are subtracted from one another in order to eliminate low frequency or DC offset signals caused by changes in the distance between the sensors and the outside diameter of the wire rope. The resultant signals contain substantially sine wave information which is processed electronically to measure the length and direction of movement of the wire rope.

The arrangement for subtraction of the probe signals also eliminates the effects of changes in signal strength due to temperature changes on the probes of the sensing means because the characteristics of each pair of probes change in substantially the same way with respect to changes in temperature.

Copending application Ser. No. 167,785, filed July 11, 1980 concurrently herewith, is directed to the housing for the proximity sensors and to the suspension system for the housing which are shown in FIGS. 6 through 10 of the drawings. The present application is directed to the overall method and electrical apparatus for measuring the direction and length of movement of the wire rope.

DESCRIPTION OF THE PREFERRED EMBODIMENTS

FIGS. 1 through 10 illustrate means for positioning the proximity sensors adjacent the wire rope for a drilling rig at a location between the drawworks and the derrick.

Figure 1:
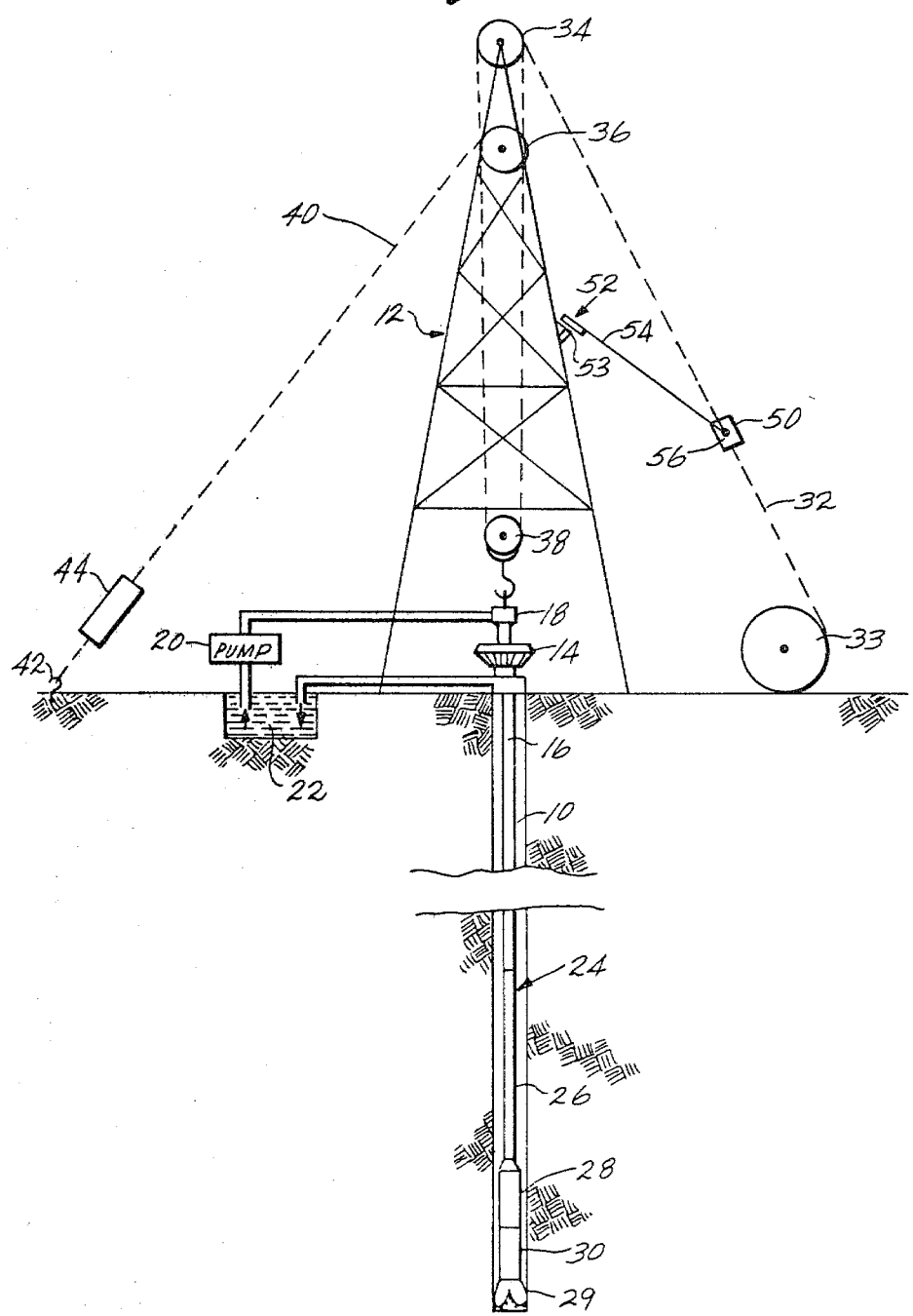
FIG. 1 illustrates a well drilling system employing the present invention.

FIG. 1 illustrates a conventional rotary well drilling system for producing a well 10 in the earth. It includes the usual derrick 12, rotary table 14, kelly 16, swivel 18, mud pump 20, mud pit 22, and a drill string 24 made up of drill pipe sections 26 secured to the lower end of the kelly 16 and to the upper end of drill collars 28 and terminating in the drill bit 29.

Well logging apparatus 30 may be incorporated in the drill string, if desired, in order to simultaneously conduct well logging while the drilling operation is under way.

The kelly and drill string are moved upwardly or downwardly by a wire rope 32 which is actuated by the drawworks 33. The wire rope passes over the crown wheel 34 to the upper block 36 and the traveling block 38 and back and then in the form of the dead line 40 to the dead line anchor 42. A tension measuring device 44 in dead line 40 enables the driller to ascertain the tension in the line, which is a measure of the hook load.

The upper block 36 and the traveling block 38 comprise several pulley sections and the wire rope passes back and forth between the two blocks to provide a desired mechanical advantage, such as 10:1.

Although the invention is described with reference to equipment which is carried by the drill string, it will be apparent that the invention may be employed to determine the depth in a well of equipment which is carried by the wire rope itself. For example, the invention may be employed with wire line logging equipment, with perforating equipment, etc. Also the invention may be employed to measure movement of wire rope in other applications, such as in elevators or with cages in mine shafts that are supported by wire rope.

In accordance with the present invention the movement of the wire rope is measured at a location between the drawworks 33 and the derrick 12. A housing 50 clamps around the wire rope 32 at a desired location. It is supported by a suspension system 52 affixed to the derrick by a pivot 53 and having arms 54 connected to the housing 50 by ball joints 56.

The drawworks 33 has a drum which is rotated by a motor and clutch (not shown), and it accommodates layers of the wire rope that may be spooled onto the drum or off it.

Figure 2:
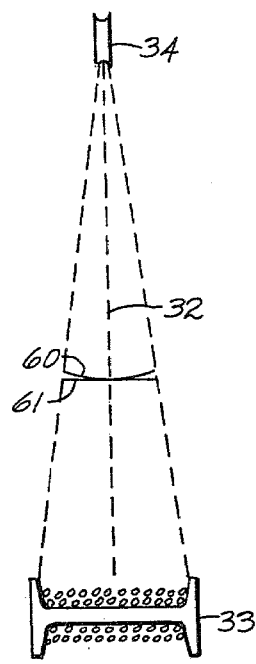
FIG. 2 illustrates the lateral movement of the wire rope along the drawworks.

FIG. 2 illustrates by the arc 60 at the location of the sensor housing the limits of the lateral movement of the wire rope 32 caused by spooling of the wire rope along the drum of the drawworks 33. The distance between the arc 60 and the line 61 is the amount of correction required in order to measure depth with accuracy. The required amount of correction decreases as the sensor housing is spaced farther from the drawworks, and in some instances the amount of correction becomes negligible and can be omitted. However, many applications require that the sensor housing be located near the drawworks and in those installations correction is desirable.

Figure 3:
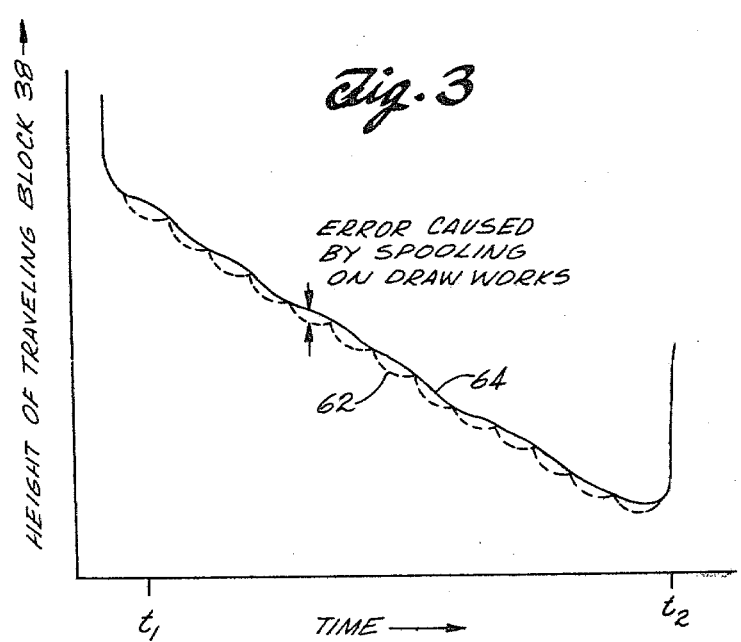
FIG. 3 illustrates the errors that would be caused by lateral movement of the wire rope along the drawworks if uncorrected.

FIG. 3 illustrates the effect of the lateral movement of the wire rope 32 upon the measurement of the longitudinal movement of the wire rope to provide a measurement of depth. Drilling, and hence logging if done while drilling, is ordinarily effected in 31 foot increments because of the length of the kelly and drill pipe. The time $t_1$ to $t_2$ illustrates the time required for one increment. The dashed curves 62 illustrate the effects on movement of the traveling block caused by lateral movement of the wire rope 32 as it is spooled from end to end of the drum of the drawworks 33.

The solid curve 64 illustrates the movement of the traveling block that would take place if there were no lateral movement of the wire rope at the drawworks. The height of the traveling block 38 indicates the depth of the drill bit 29 and well logging instruments 30 in the drill string 24 during each 31 foot increment of drilling. Thus, the failure of the dashed curves 62 to follow the solid curve 64 constitute errors in the measurement of depth based upon measurement of the longitudinal movement of the wire rope. Those errors are corrected by the action of the suspension system 52 in changing the effective length of the arms 54 to make the desired corrections.

Figure 2A:
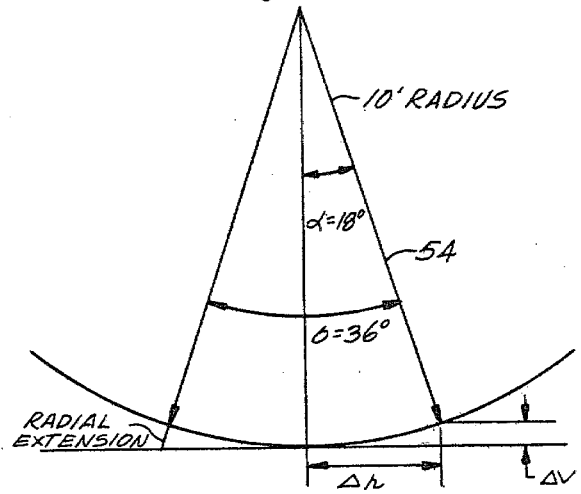
FIG. 2A shows how the effective length of the arms for supporting the housing for the sensors is adjusted to compensate for errors in measurement that would be caused by lateral movement of the wire rope along the drawworks.

FIG. 2A illustrates the amount of radial extension required to change the effective length of the arms 54 over a path defining an internal angle of 36° in an embodiment of this invention employing arms 54 having an unextended length of 10 feet and with a drawworks 6 feet wide. The maximum change in arm length is 6.175 inches for this embodiment of the invention, as shown in the following computation. The computations for 4° through 15° are omitted for brevity.

TABLE I

| Radial extension required = $\Delta V/\cos\alpha$ to meet horizontal | | | $\Delta h = 10 \sin\alpha$ | $\Delta V = 10 - 10\cos\alpha$ |
|---|---|---|---|---|
| per degree $\alpha$ | ft. | in. | $\alpha$ $\Delta h$(ft) | $\Delta V$(ft) |
| 1° | .001002 | .012024 | 1° .1745 | .0015 |
| 2° | .0061037 | .0732444 | 2° .3489 | .0061 |
| 3° | .0137188 | .1646256 | 3° .5233 | .0137 |
| . | . | . | . . | . |
| . | . | . | . . | . |
| 16° | .402908 | 4.834896 | 16° 2.7563 | .3873 |
| 17° | .4568627 | 5.4823524 | 17° 2.9237 | .4369 |
| 18° | .5145856 | 6.1750722 | 18° 3.0901 | .4894 |

Figure 4:
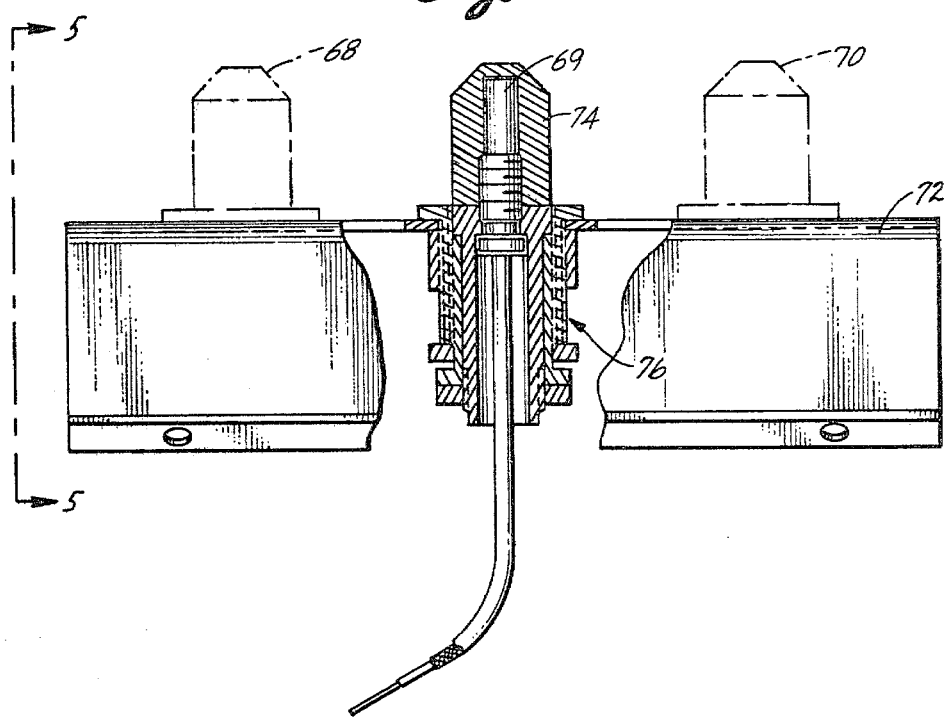
FIG. 4 is a side view, partially broken away, showing the sensors and their mounting bracket.
Figure 5:
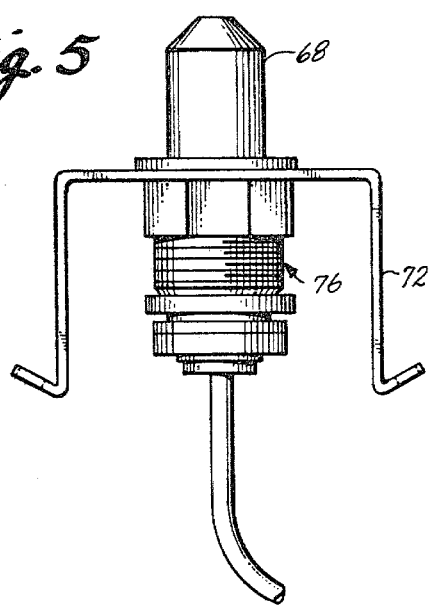
FIG. 5 is an elevation view along line 5—5 of FIG. 4.

FIG. 4 shows three sensing elements 68, 69, 70 mounted on a bracket 72. Each sensing element is encased in a plastic cover 74 for protection and each is provided with mounting means 76 permitting adjustment with respect to the path of the wire rope.

Figure 6:
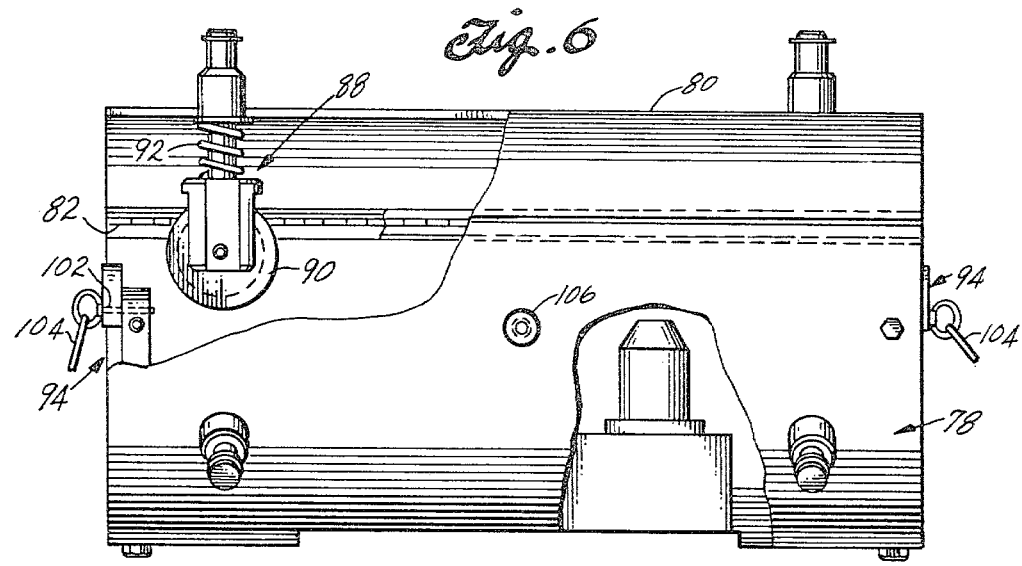
FIG. 6 is a side view, partially broken away, of the housing for the sensors.
Figure 7:
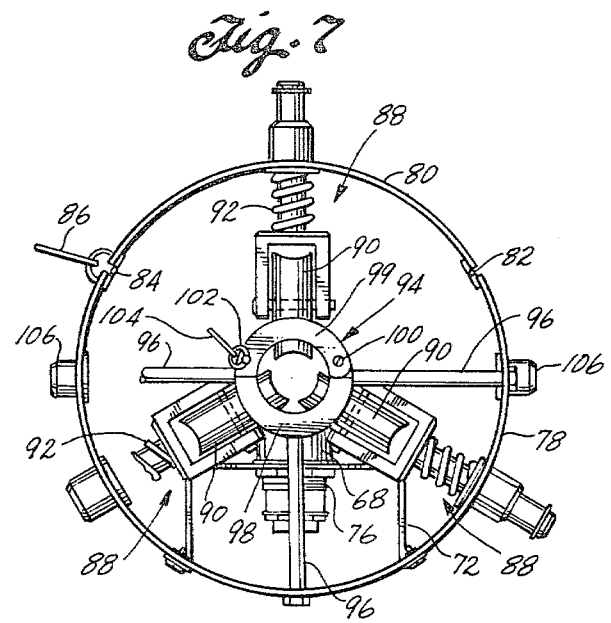
FIG. 7 is an end view of the housing for the sensors.

FIGS. 6 and 7 show the housing for the sensing elements. It comprises a cylindrical shell housing 78 with a hinged portion 80 supported by a hinge 82 along one side and by latch pins 84 along the other side. The latch pins are preferably connected to the derrick by flexible lanyards 86. Upon actuation of the lanyards as a result of some malfunction in the wire rope system, the latch pins 84 will be released allowing the hinged portion 80 to open so that the sensor housing can separate from the wire rope.

The sensors must be positioned a set distance away from the surface of the wire rope for proper operation, and that distance must be maintained within a fractional portion of an inch. To meet those reqirements, six bearing rollers 88 are employed at two spaced locations along the housing—three at each end of the housing. The bearing rollers 88 have plastic rollers 90 that ride against the surface of the wire rope. They are spring loaded to the housing by springs 92.

The purpose of spring-loading the bearing rollers is three-fold: first, to keep the sensor housing centralized about the cable regardless of wear on the individual bearing rollers themselves, thus maintaining proper positioning of the proximity sensors with respect to the wire rope; secondly, to provide shock and vibration dampening from the cable that would otherwise be transmitted to the sensors with possible impairment of their operation; the third purpose for spring-loading the bearing rollers is to provide a jettisoning force for ejecting the sensor housing from the cable in the event of a malfunction.

Cable restraints 94 are located at each end of the housing. Each cable restraint is mounted on struts 96, and has a pair of semicircular rings 98, 99, with the ring 98 being fixed and the ring 99 being pivoted at 100 and held in position by latch pin 102. Preferably the latches 102 are connected to the derrick by flexible lanyards 104. Upon actuation of the lanyards as a result of some malfunction in the wire rope system, the latch pins 102 will be released along with the latch pins 84 that secure hinged portion 80 of the housing so that the entire housing structure can separate from the wire rope.

The cable restraints 94 confine the wire rope to a specific area as it passes through the sensor housing. This aids tracking of the bearing rollers 88 in the event of extreme gyrations or whipping of the wire rope. The cable restraints 94 also serve to provide a controlled exit path for the wire rope in the event jettisoning of the sensing housing is necessary.

Figure 8:
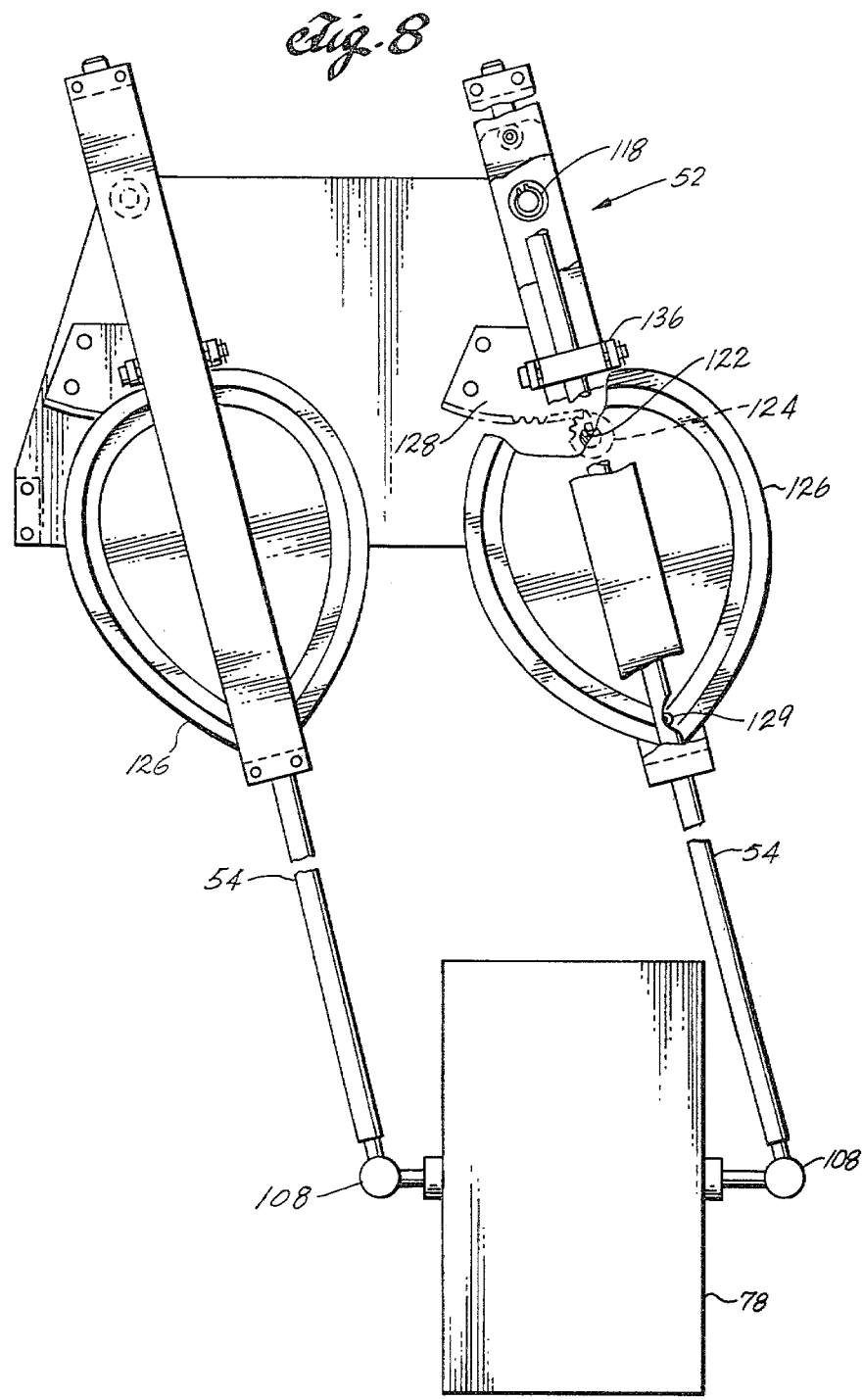
FIG. 8 illustrates the overall carrier system with the housing for the sensors and the suspension system for the housing.

A pair of bushings 106 are provided for coupling the housing 78 to the arms 54 of the suspension system 52 through a pair of ball joints 108 (FIG. 8).

Figure 9:
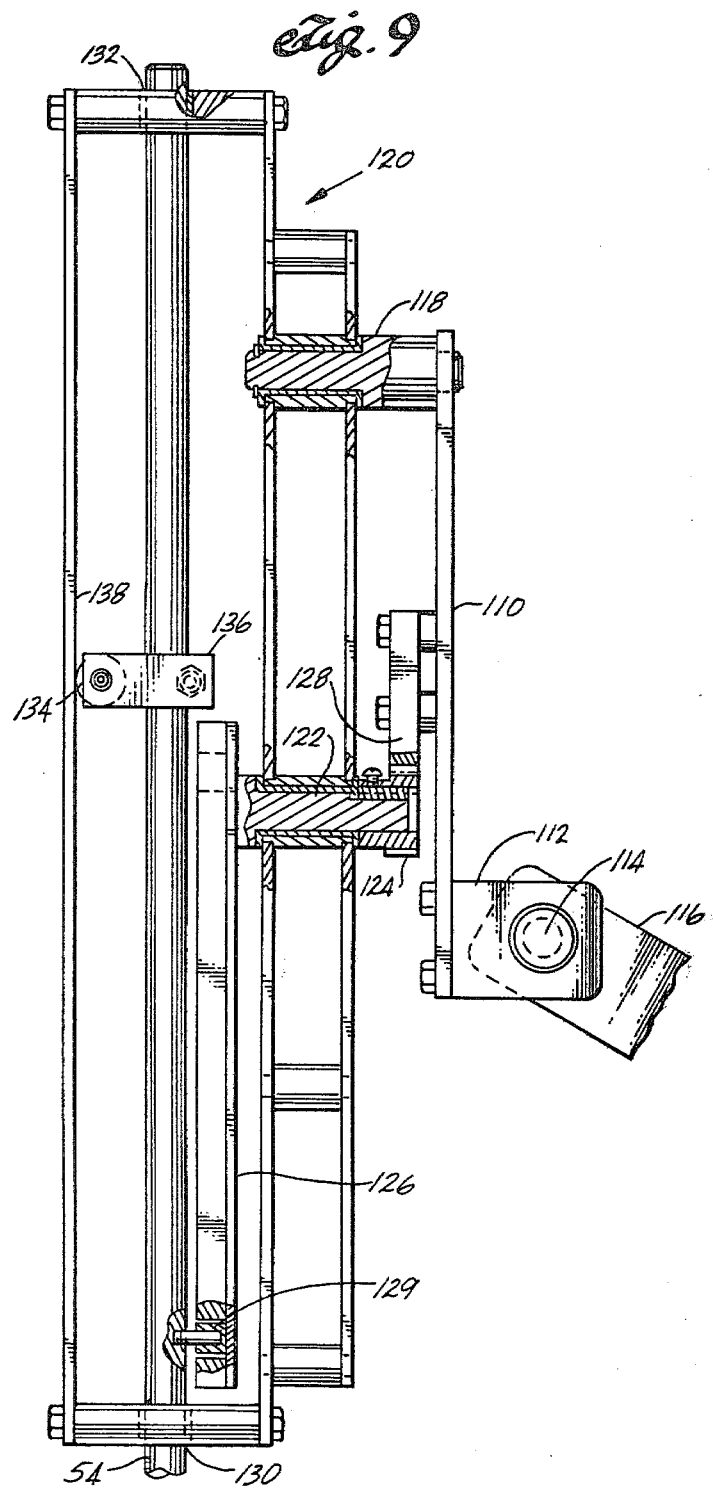
FIG. 9 is a side view, partially in section, of mechanism of the suspension system for the housing.

The suspension system 54 of FIGS. 8 and 9 serves to adjust the effective length of the arms 54 which support the housing 78 to compensate for errors in measurement that would be caused by lateral movement of the wire rope along the drawworks.

As illustrated in FIG. 2A, the development of the compensator mechanism is based upon the amount that the length of the arms 54 are required to extend per degree of arc caused by lateral movement of the wire rope, such that the ends that are connected to the housing 78 will maintain a horizontal path. Using the midpoint of arc travel as zero deviation, the radial extension of the arms 54 required to maintain zero deviation per degree of arc is calculated as set forth in Table I. This data provides the information required to develop a cam action for causing the arms 54 to extend the designated amount per degree of arc travel.

Figure 10:
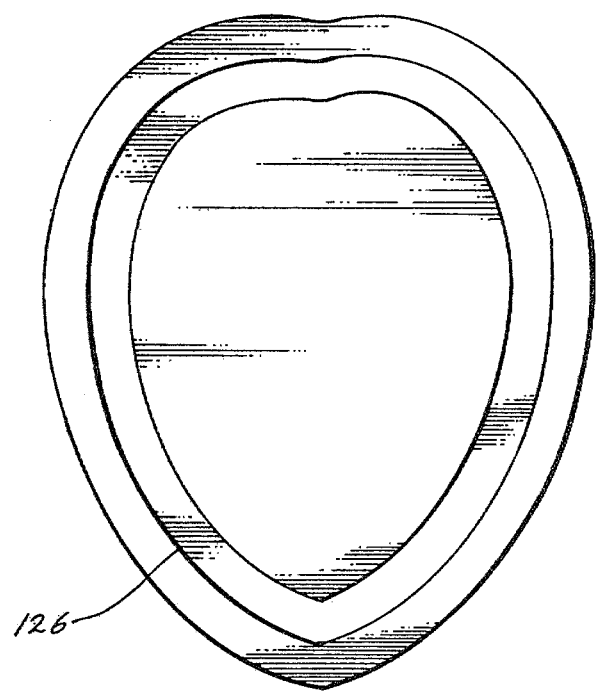
FIG. 10 is a plan view of the cam employed in the suspension system of FIG. 9.

The compensator mechanism of the suspension system 52 is disclosed in FIGS. 9 and 10.

A support arm 110 is attached to the derrick at any suitable location through a bracket 112, a pivot 114 and an arm 116 that is rigidly attached to a selected location on the derrick structure (not shown).

A fixed or primary pivot shaft 118 extends from the upper end of the support arm 110, and the compensator mechanism is suspended by the fixed primary pivot shaft 118. A main frame assembly 120 is pivoted on the shaft 118 in positions that are determined by the lateral movement of the wire rope as it passes through the housing 78 for the sensors.

A shaft 122 is pivoted in a mid-portion of the main frame. The shaft 122 carries a spur gear 124 on one end and it is rigidly affixed to a cam 126 at the other end. A fixed gear section 128 is affixed to the arm 110 in a position to engage the spur gear 124. Thus, movements of the main frame 120 caused by lateral movements of the wire rope cause the spur gear 124 to rotate along the fixed gear section 128, thereby causing rotational movements of the cam 126. The movements of the cam 126 are imparted to the arm 54 through a cam follower 129 which is inserted into the cam 126 at one end and affixed to the arm 54 at the other end. Thus, movements of the cam 126 cause corresponding movements of the arm 54. The cam 126 is shaped to provide the radial extensions of the arm 54 as calculated in FIG. 2A and Table I. It will be obvious that arms of different length or drawworks of different width will require radial extensions different from those shown on FIG. 2A and cam shapes that are different from that shown on FIG. 10.

Movements of the arm 54 are guided in bushings 130, 132 located in the ends of the mainframe 120. A roller 134 that is affixed to the arm 54 by a bracket 136 and rolls along the surface 138 of the mainframe serves to provide lateral stability for the arm when it is moved by the cam 129.

In accordance with this invention, the cyclic information available from the spiral lays in a typical wire-rope construction is used as a means of monitoring the linear movement of the wire rope past a fixed reference point. In order to have good reliability, it is desirable to be able to detect the cyclic information from the wire rope lays using a non-contacting electronic means.

One type of electronic device that can do this is the Radio Frequency Inductive Proximity Sensor. This type of proximity sensor works on the following basic principle: The proximity sensor, or proximity probe, as it is sometimes called, consists of a low inductance coil usually wound on a ferrite core. The coil forms part of an oscillator circuit, which oscillates at a high frequency, typically 200 KHz or higher. Placing a metallic object in front of the coil causes induced eddy currents to flow in the surface of the object, which in turn changes the apparent Q factor of the coil. This change is sensed by the electronics associated with the sensor and then translated into a DC voltage level output. As the object or target, as it is also called, is moved towards or away from the coil, the output voltage also changes, thus giving an indication of the distance between the sensor and the target.

A number of manufacturers make proximity sensor systems that work on this principle—the "Electro-Mike", made by the Electro Corporation of Sarasota, Fla.; the "7200 Proximity Transducer System", made by Bently Nevada of Minden, Nev.; and the "KD2300 Series", made by Kaman Science Corporation of Colorado Springs, Colo. U.S. Pat. No. 4,068,189, which issued on Jan. 10, 1978, to Electro Corporation, discloses the "Electro-Mike" system.

Figure 11:
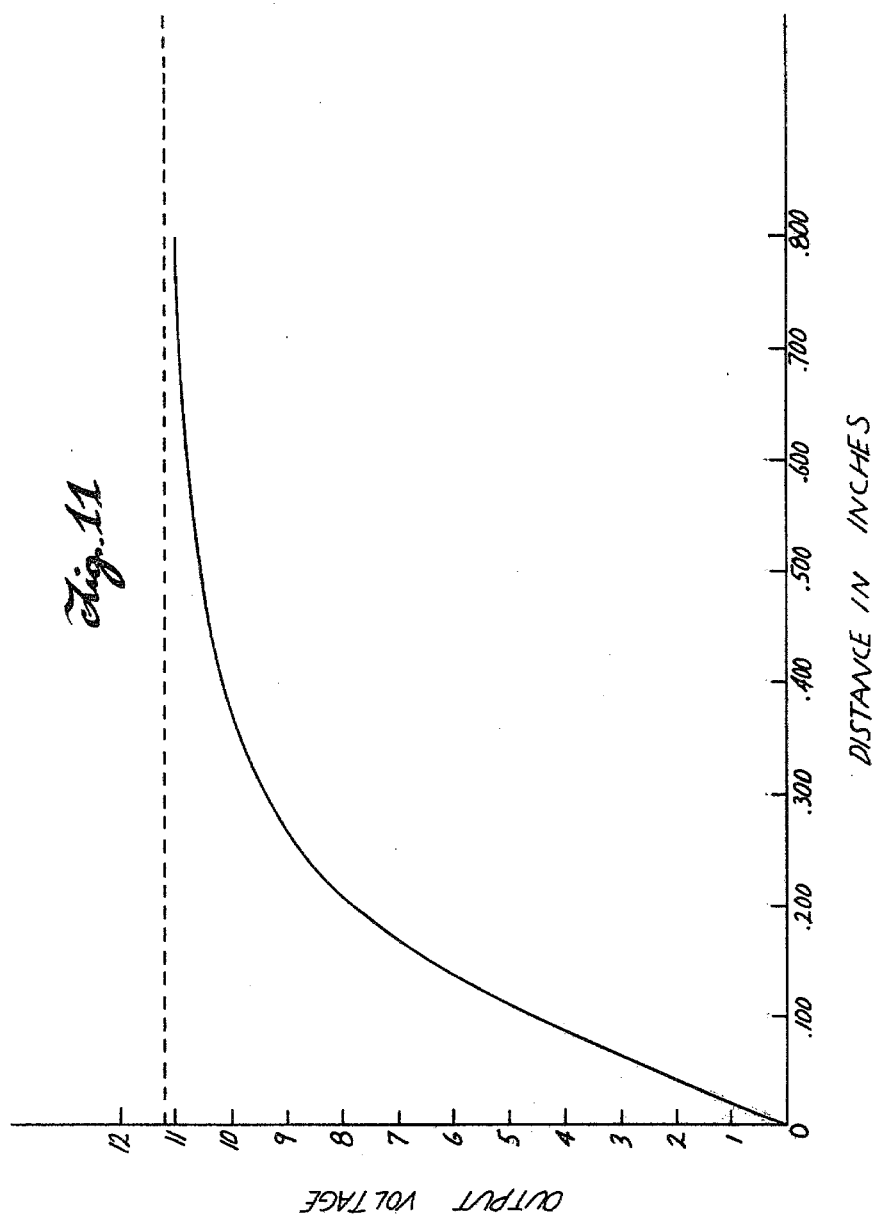
FIG. 11 is a curve showing the relationship between the output voltage of a sensor and the distance from a target.

A maximum range response curve for the Electro-Mike model PA 12D43 system is shown in FIG. 11. The curve represents the output voltage versus the target-to-sensor distance.

Figure 12:
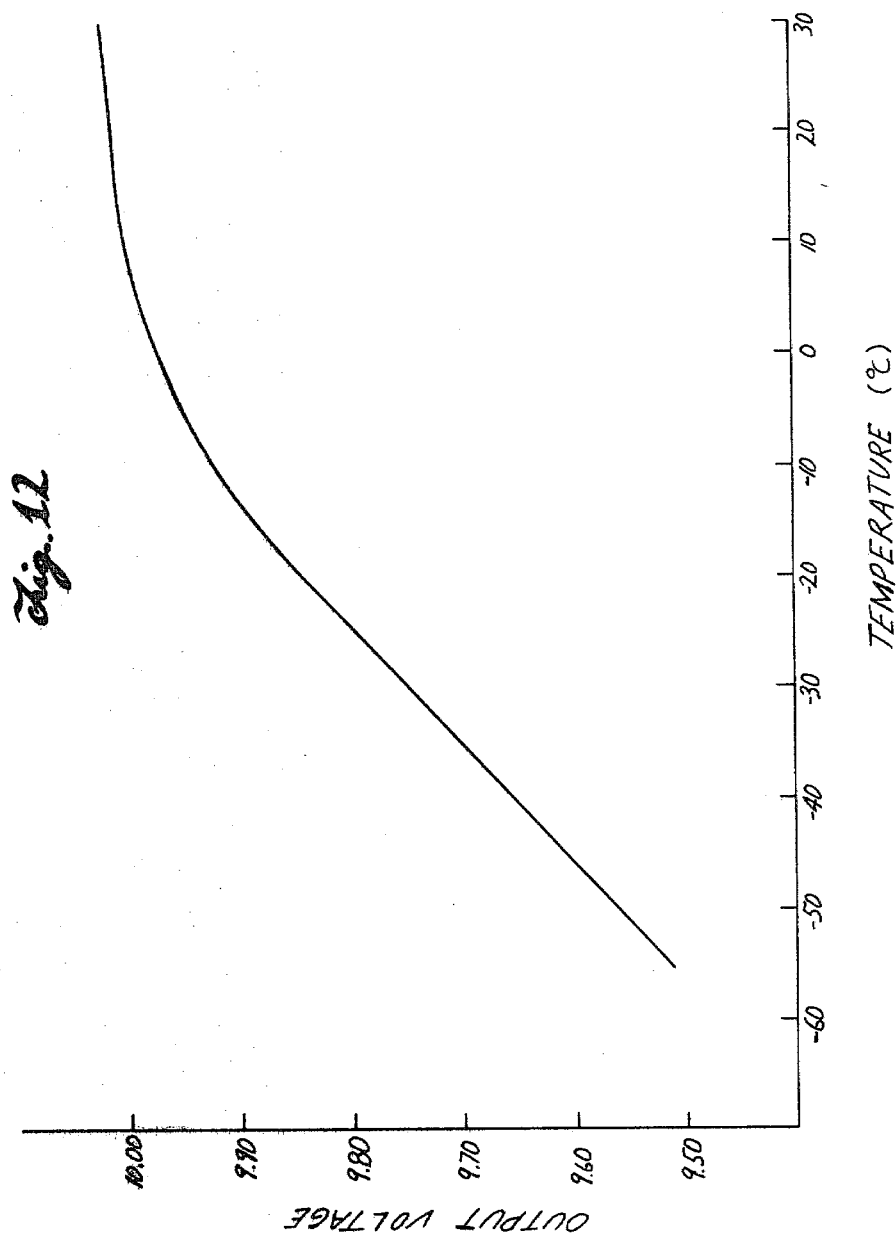
FIG. 12 shows how the output of a sensor varies with temperature.

In addition to this the sensor characteristics are somewhat dependent on the ambient temperature, especially below $-10°$ C. as shown in FIG. 12. This effect is mainly due to change in the characteristics of the ferrite core of the coil.

Figure 13:
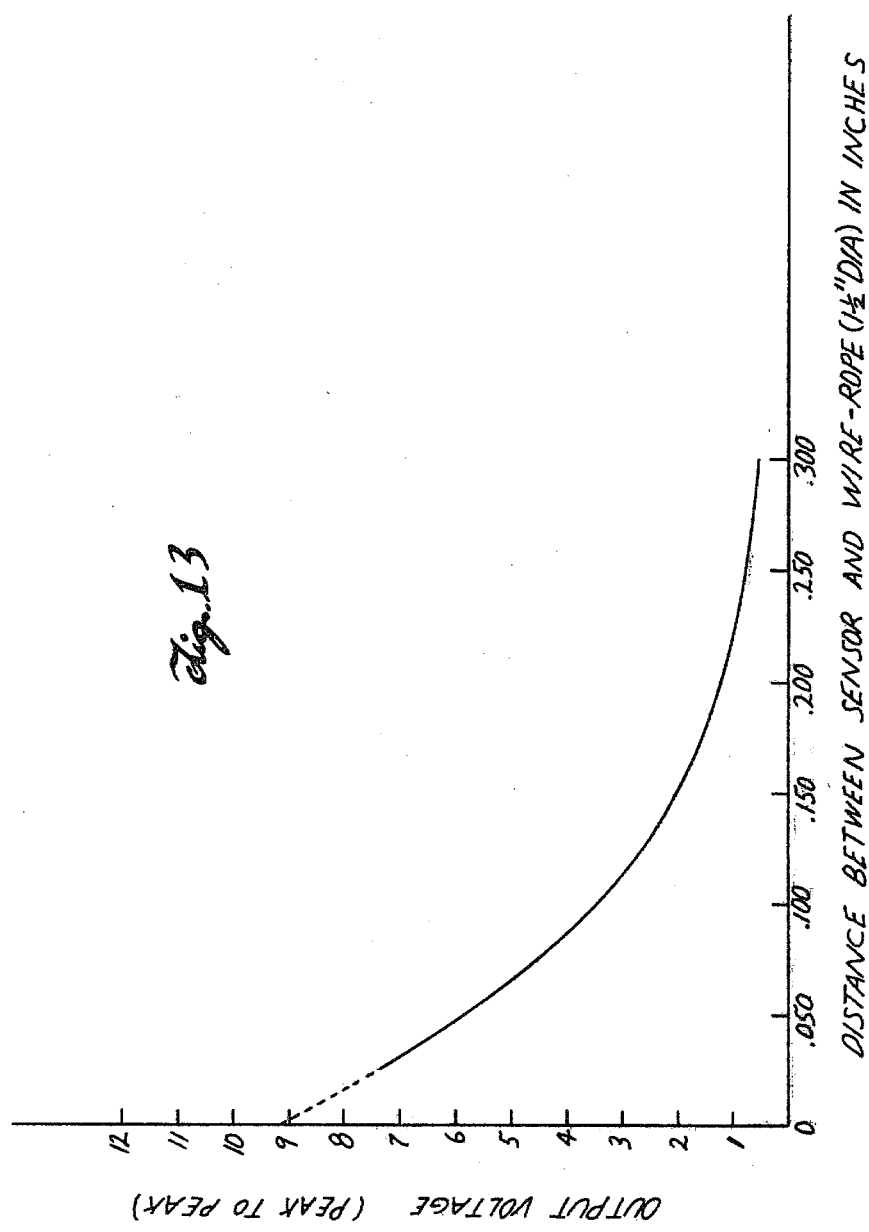
FIG. 13 shows how the peak-to-peak output voltage of a sensor varies with distance from a moving wire rope.

If a wire rope is passed by a proximity sensor similar to the ones mentioned above, the voltage output is roughly a sine wave (due to the profile of the lays), with a peak-to-peak amplitude depending on the distance from the sensor to the outside most diameter of the wire rope. This is illustrated in FIG. 13.

Figure 14:
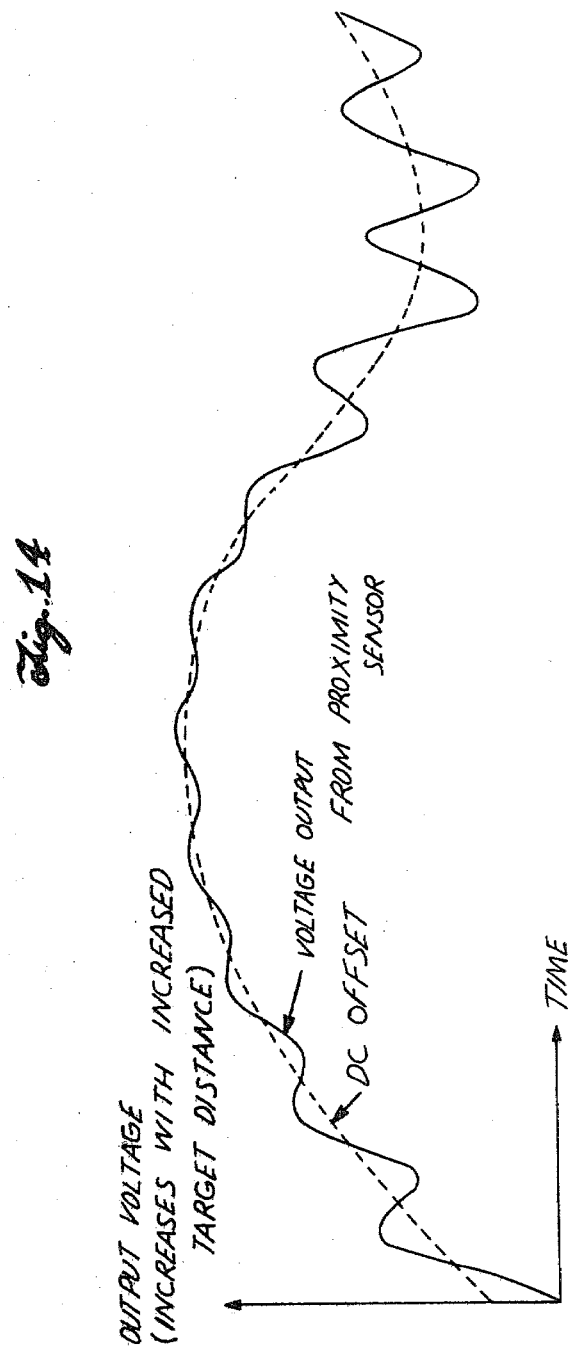
FIG. 14 shows how the output signal from a proximity sensor is affected by a low frequency or direct current offset caused by movement of the sensors.

Even when using a good suspension, e.g., such as described herein, it is difficult to maintain the distance from the sensor to the outermost diameter of wire rope absolutely constant. In addition, the above-noted temperature effects must be taken into account. If the output of the proximity sensor is plotted versus time, as the wire rope passes in the front of the sensor, we may expect an output curve similar to that in FIG. 14. It takes the form of a sine wave riding on a varying low frequency or DC offset—the DC offset being due to the varying distance between the sensor and the wire rope and, on a greater time scale, temperature effects. What is desired is a means of removing the unwanted low frequency or DC offset and retaining the sine wave information.

Figure 15:
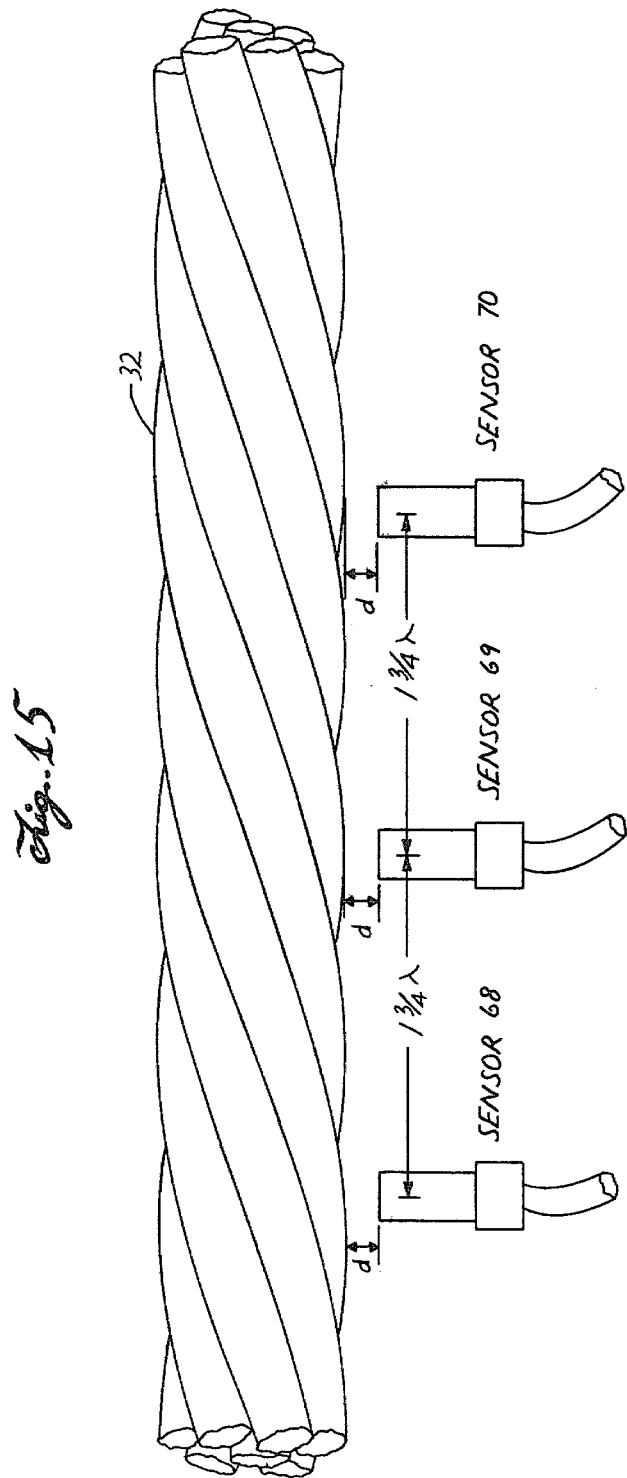
FIG. 15 illustrates the relationship of the sensors with respect to one another and with respect to the wire rope.

This can be achieved by using three proximity sensors arranged as shown in FIG. 15. Each proximity sensor is calibrated to have exactly the same response curve as its neighbors, similar to the curve in FIG. 11. In FIG. 15, the distance between the center of each proximity sensor is preferably arranged to be $1\frac{3}{4}$ of the distance between each lay of the wire rope. In actuality, this distance could be $1\frac{1}{4}$, $1\frac{3}{4}$, $2\frac{1}{4}$, $2\frac{3}{4}$, $3\frac{1}{4}$, etc., although from a practical viewpoint, $1\frac{3}{4}$ is best. Thus, in preferred arrangements the sensors may be spaced approximately 5/4 of a wavelength or half wave multiples thereof, i.e., 5/4 the distance between the spiral windings or any number of 2/4 additions to that distance. The spacing is not very critical and it merely need be such that the respective signals differ in phase by an amount sufficient to give a reasonable reading. For example, satisfactory results can be obtained if the signals are out of phase by $\frac{1}{8}$ of a wavelength, rather than the preferred $\frac{1}{4}$ wavelength described above. The sensors are set up so that each is the same distance from the wire rope outside diameter.

Figure 16:
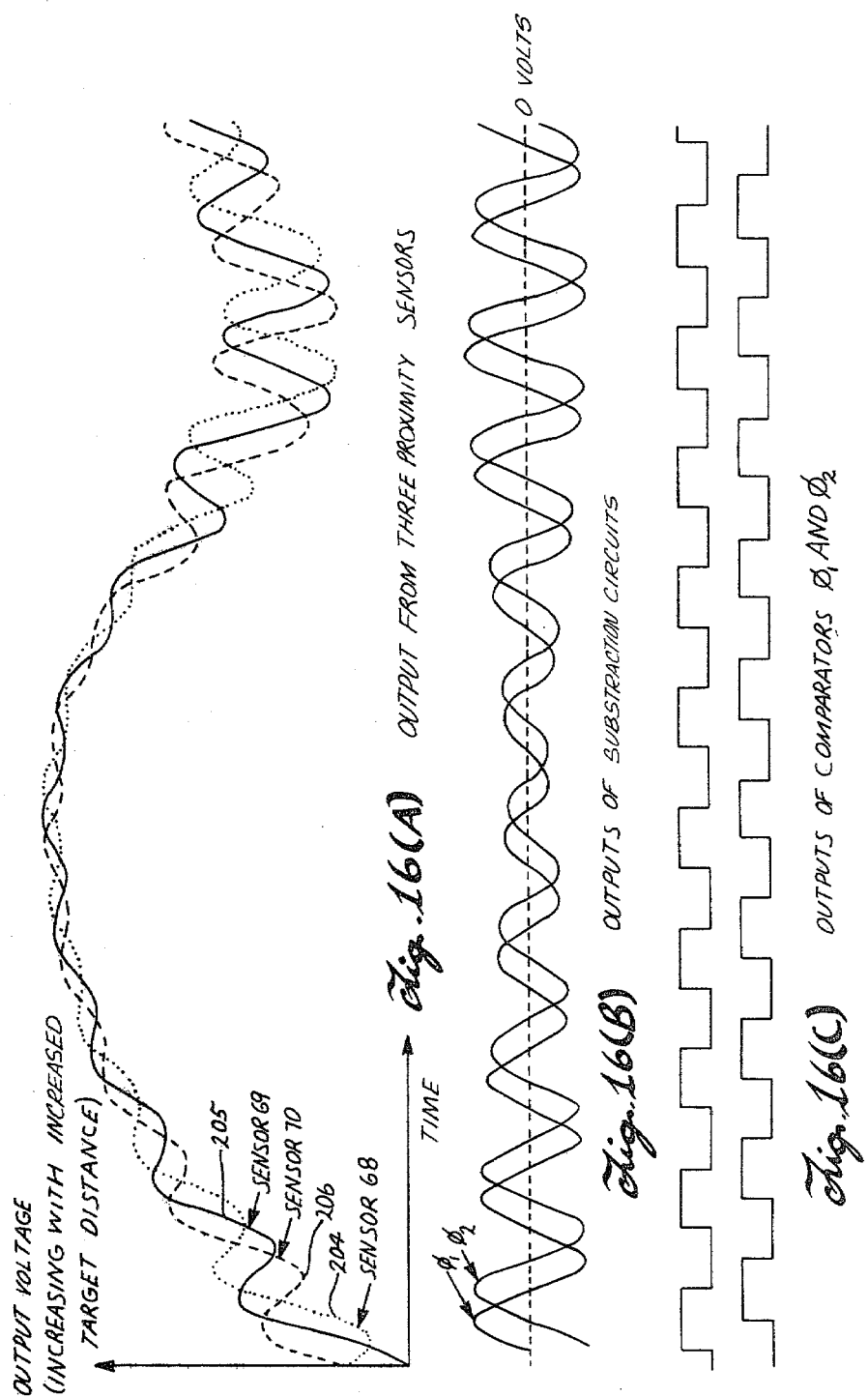
FIGS. 16(a), 16(b), 16(c) are wave forms illustrating the overall operation of the apparatus of this invention.

FIG. 16(A) shows the outputs of the three proximity sensors superimposed on one another. The outputs are similar to that shown in FIG. 14, but now all three outputs are riding on a common DC offset, due to the fact that all three sensors are affected by the unwanted offset signal by the same degree.

As will be discussed with reference to FIG. 17, the signal 204 from sensor 68 is subtracted from signal 205 from sensor 69. The result $\phi_1$, shown in FIG. 16(B), is the removal of the DC offset and the retention of the sine wave information. The sine wave amplitude is slightly increased also. Similarly, signal 206 is subtracted from signal 205, leaving $\phi_2$. Now there are two signals, $\phi_1$ and $\phi_2$, which contain only the sine wave information, the sine waves in $\phi_1$ and $\phi_2$ being 90° out of phase as shown in FIG. 16(B). This phase information is used to determine which direction the wire rope is passing.

The signals $\phi_1$ and $\phi_2$, after being filtered to remove any cross-talk, are passed through comparators which produce the square waves shown in FIG. 16(C). The square wave signals are then passed through a logic network to a counter, where the phase of the square wave signals is used to indicate the direction of movement of the wire rope and the number of square waves is used to measure the length of movement of the wire rope.

Figure 17:
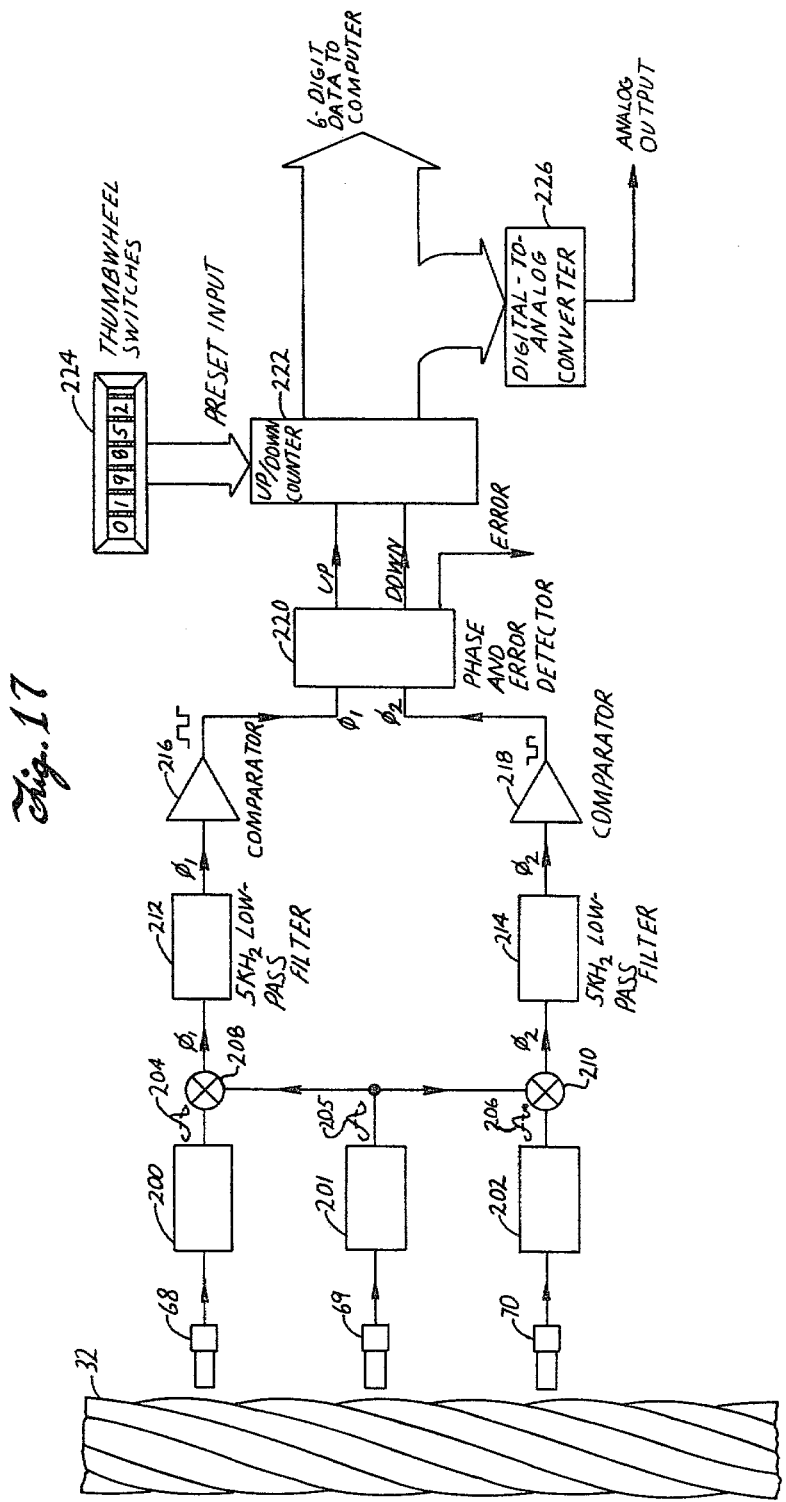
FIG. 17 is a block diagram of a circuit suitable for carrying out this invention.

FIG. 17 illustrates in block diagram from a suitable electrical circuit for converting the signals produced by the sensors to a numerical readout.

The sensors 68, 69 and 70 are located adjacent the wire rope by the housing 50 of FIGS. 1 and 6. The sensors are connected to conversion circuits 200, 201 and 202 located on the drill platform. The conversion circuits, such as illustrated in U.S. Pat. No. 4,068,189, produce the signals 204, 205 and 206 which are illustrated at FIG. 16(A).

Those signals are applied to subtraction circuits 208 and 210 which are differential amplifiers, where the signal 204 is subtracted from the signal 205 to produce $\phi_1$, and signal 206 is subtracted from signal 205 to produce $\phi_2$.

The signals $\phi_1$ and $\phi_2$ are passed through 5 KHz low pass filters 212 and 214. The purpose of the filters is to remove any unwanted signals above 5 KHz which result from the operation of the proximity sensors. The sensors themselves are set up to have an oscillator frequency that differs by at least 5 KHz from its neighbor, as some mutual interference, or cross-talk between each neighboring sensor is unavoidable. This interference is then removed by the 5 KHz low-pass filters.

The filtered $\phi_1$ and $\phi_2$ signals are then applied to comparators 216 and 218 which produce two square waves as shown in FIG. 16(C), which are again 90° out of phase. The two square waves are passed into a phase and error detector 220 network which determines the direction from the phase, and outputs appropriate up or down pulses (one for every lay which passes the sensor array). It is also programmed to determine an error condition that may occur in an event such as a malfunctioning sensor.

The up and down pulses are then used to clock an up/down counter 222. The output of the up/down counter, which in this case is a 6-digit BCD counter (i.e., counts from 0 to 999999), represents the amount of wire rope that has passed the sensor array from a given reference point. This reference point is established by pre-setting the up/down counter using the thumbwheel switches 224 to a number that corresponds with the block 38 in the derrick being in a known position. Any movement in the block (hence the wire rope) then causes the up/down counter output to change correspondingly. This data from the up/down counter can be used in a number of ways. It can be converted in an analog form using a suitable digital-to-analog converter 226, or it can be fed directly into a micro-processor or computer for further computation to determine equipment depth. Corrections for depth errors introduced by variations in hook load (tension in dead line) can also be computed.

Figure 18:
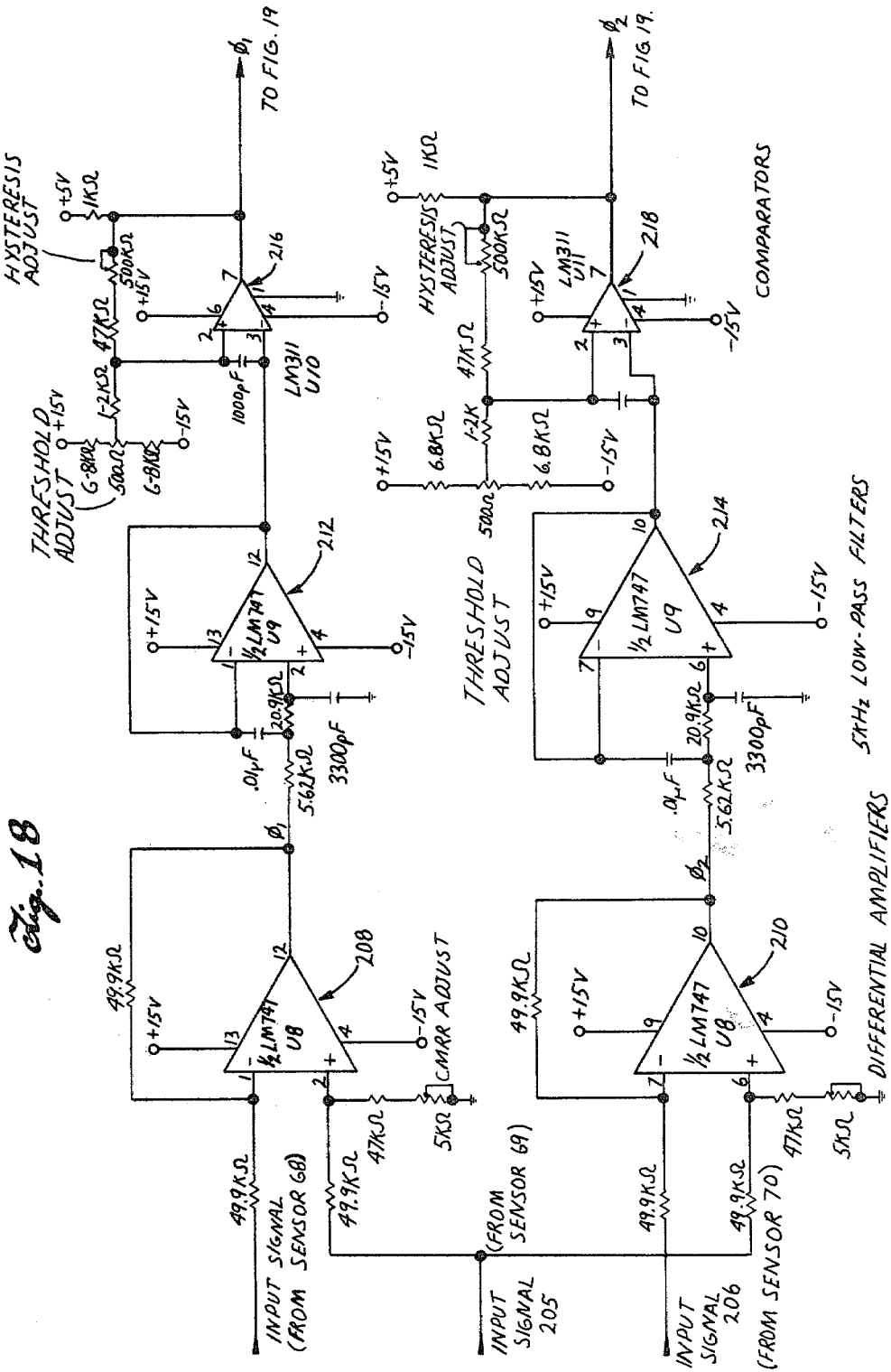
FIGS. 18 and 19 are detailed circuit diagrams of the circuit for carrying out this invention.
Figure 19:
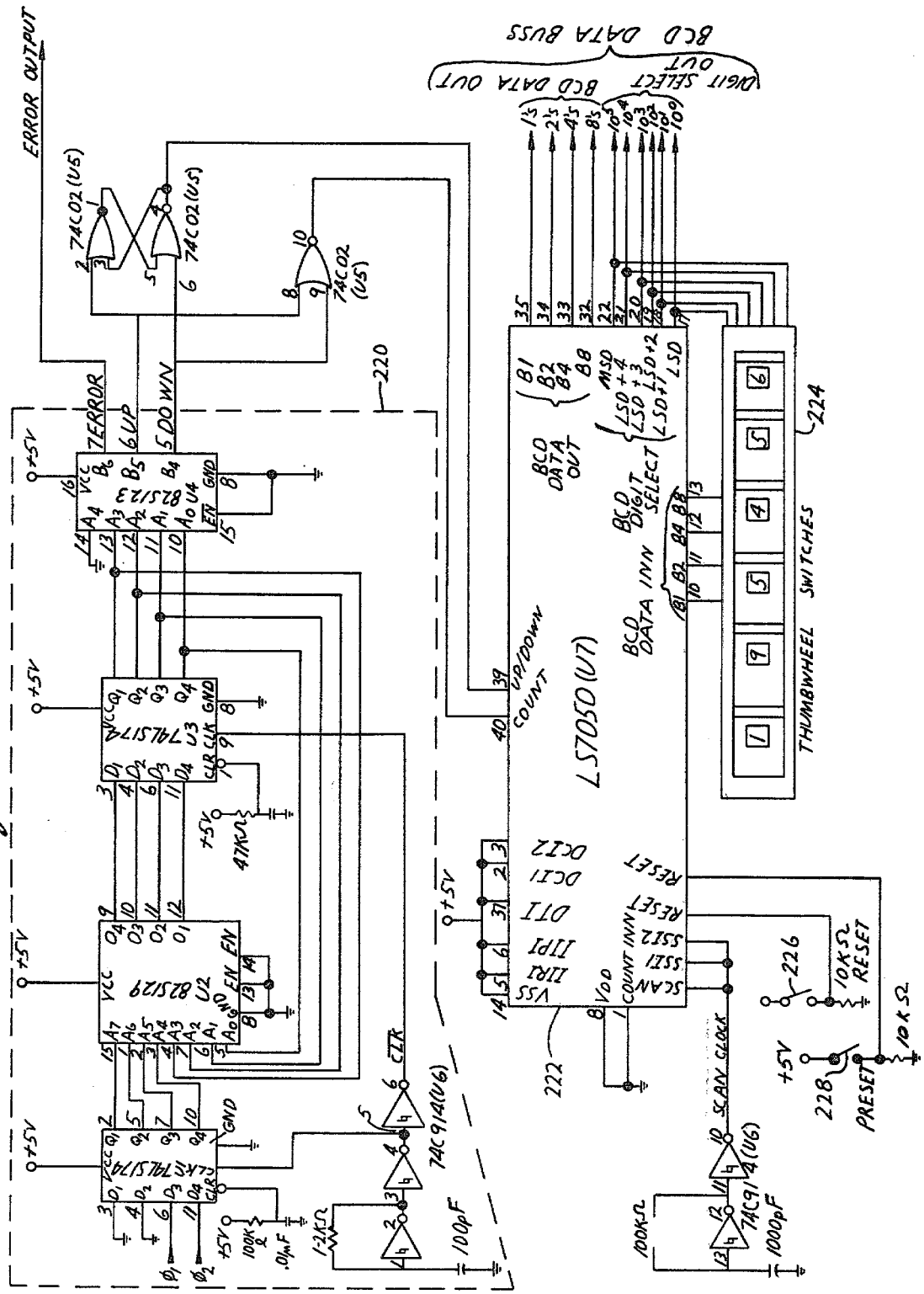

FIGS. 18 and 19 show detailed circuits corresponding to the blocks of FIG. 17, which may be broken down into the analog electronics of FIG. 18 and the digital electronics of FIG. 19.

Analog Electronics of FIG. 18

The three analog inputs from the proximity sensors 68, 69 and 70 are fed into the two differential amplifiers 208 and 210. The differential amplifiers are constructed from one LM747 dual operational amplifier I.C. (U8). The outputs from these two amplifiers are sensor 69--sensor 68=$\phi_1$, and sensor 69-sensor 70=$\phi_2$, respectively. The 5KΩ potentiometers are used to adjust the common-mode rejection ratio of each differential amplifier for optimum performance.

The low-pass filters 212 and 214 consist of a second order VCVS (Voltage Controlled Voltage Source) filter with a $-3$ dB point of 5 KHz. Again, a LM747 dual operation amplifier I.C. (U9) is used. The purpose of these filters is to remove any unwanted frequencies above the 5 KHz region, especially those generated by hetrodyning or beating due to cross-talk between the proximity sensors.

The comparators 216 and 218 consist of two LM311 Comparator I.C.'s (U10 and U11). Their purpose is to convert the two sine wave signals $\phi_1$ and $\phi_2$ into square waves. The threshold adjust potentiometers adjust the input voltage at which the comparator output changes. The hysteresis adjust control set the amount of hysteresis there is on the threshold voltage. This ensures that the square wave leading and trailing edges are clean and free from spurious noise. Outputs from the comparators are now digital, i.e., a logic '0' or '1'.

Digital Electronics of FIG. 19

The phase and error-detector circuit 220 consists of I.C.'s U1, U2, U3 and U4. U2 is a 82S129, 256×4, Programmable Read-On-Memory (PROM) manufactured by Signetics Corp., U4 is a 82S123, 32×8 PROM, manufactured by Signetics. U1 and U3 are 74LS174 Hex 'D' flip-flop I.C.'s with a number of manufacturers such as Texas Instruments. The operation of the circuit is simply a sequential logic circuit. The inputs, $\phi_1$ and $\phi_2$, are fed into A5 and A4 respectively. For any given input into U2, the output will be the programmed output (01 to 04). This output is fed back into the input (via U3), which then produces a new output. This new output can be the same as the previous output, in which case the circuit assumes a stable state, or the new output can be different in which case the new output produces a new input, and so on until a stable state occurs. Thus, for any given sequence of $\phi_1$ and $\phi_2$, the output of U2 can be programmed to behave in the desired manner. The purpose of U1 and U3 is to ensure that the relative timing of the input and outputs to U2 do not cause so-called "race" problems. Note that U1 and U3 are driven on opposite phases of the clock pulses. U4 is programmed to decode the output of U2 into signals of a usable form, in this case, UP, DOWN, and ERROR signals. The three inverters, 74C914's, U6, form an oscillator which drives U1 and U3.

The Up/Down Counter is based around an I.C. type LS7050 manufactured by LSI Computer Systems, Inc., 1235 Walt Whitman Rd. Melville, N.Y. (11747). This is a Large Scale Integrated Circuit (LSI) 6-decade Up/Down Counter, with a preset facility, and multiplexed BCD (Binary Coded Decimal) output. The three NOR-gates 74C02 I.C. (U5) convert the Up/Down pulses into the COUNT, UP/DOWN format required by the LS7050. COUNT pulses cause the counter to count up or down, depending on the status of the UP/DOWN signal. The counter may be reset to zero by switch 226. The counter can be preset to any desired value using data from the thumbwheel switches 224. The preset facility is controlled by preset switch 228. The output of the counter appears as multiplexed BCD data at the "BCD Data Out" pins. The two inverters (74C914), U6, form an oscillator which drives the scan input. This is used to operate the multiplexing circuit inside the LS7050 counter.

Thus, the counter provides a digital readout of the length and direction of movement of the wire rope. The digital readout may be further refined to compensate for wire rope stretch and for referencing to the sea bed for offshore rigs, as follows.

As the wire rope supports the weight of the drill string assembly it undergoes elastic stretch. In order that the accuracy of the block height system can be maintained under these circumstances, some way of compensating for the stretch is needed. Mathematically, the block height above the drill floor can be determined from this equation:

$$\text{Block Height} = H_{DC} - (\Delta L \times n_{count} \times (1+\delta))/N$$

Where:

$H_{DC}$ = Height between drill floor and derrick.

$\Delta L$ = Distance of each lay in the wire rope.

$n_{count}$ = The number of lays between the proximity sensor array and the dead-line anchor.

N = Number of lines rigged up in the hoist, usually ten, which is the mechanical advantage of the hoisting system.

$\delta$ = Wire rope elastic stretch (length/unit length)

$\delta$ can be calculated from:

$$a = F/(A \times E)$$

Where:

F = Tension in the wire rope.

A = Effective cross-sectional area of the rope.

E = Elongation modulus of rope.

E = 15 to $18 \times 10^6$ psi for the majority of wire ropes used.

A ≈ 0.406 × (diameter of rope)$^2$ inches$^2$ (as a rule of thumb).

F can be directly measured from the hook load monitoring system which is present on the majority of drilling rigs. Thus, knowing the above parameters, $\delta$ can be calculated for any given value of F. Using analog or digital computing techniques, a value of the Block Height, compensated for wire rope stretch, can be calculated.

On floating offshore rigs, in order that the measurements are referenced to the sea bed, the relative distance between the drill floor and the top of the marine riser (known as riser position) needs to be determined. Also, on those rigs equipped with motion compensators, the distance between the block and the hook (block separation) needs to be known. The relative position of the hook compared with the sea bed reference can then be determined from the equation:

$$\text{Hook Position} = \text{Block Height} - \text{Block Separation} - \text{Riser Position}$$

What is claimed is:

1. Apparatus for measuring the length of movement of spiral wound wire rope in either longitudinal direction comprising:
   (a) three proximity sensors adapted to be located adjacent the wire rope along the direction of movement of the wire rope, with adjacent pairs of the sensors being spaced to produce signals in response to movement of the spiral windings of the wire rope that are of different phase with respect to one another;
   (b) means for deriving an electric signal from each proximity sensor having a magnitude that is representative of the distance between the sensor and the adjacent portion of the wire rope;
   (c) means responsive to the electric signals from the proximity sensors for providing alternating current signals free from any low frequency or direct current components; and (d) means responsive to said alternating current signals for providing digital signals that are representative of the length and direction of movement of the wire rope.

2. The apparatus of claim 1 further including an up-/down counter responsive to said digital signals for providing a visual measure of the movement of the wire rope.

3. Apparatus for measuring the length of movement of spiral wound wire rope in either longitudinal direction comprising:
  (a) three proximity sensors adapted to be located adjacent the wire rope and spaced along the direction of movement of the wire rope, with adjacent pairs of the sensors being spaced to produce signals in response to movement of the spiral windings of the wire rope that are of different phase with respect to one another;
  (b) means for deriving an electric signal from each proximity sensor having a magnitude that is representative of the distance between the sensor and the adjacent portion of the wire rope;
  (c) means for subtracting pairs of said electric signals from one another to provide a pair of alternating current signals that are substantially free from any low frequency or direct current component;
  (d) means for determining the direction of movement of the wire rope by comparing the phase relationship between said alternating current signals; and
  (e) means responsive to said alternating current signals for producing real time signals that are representative of the length of movement of the wire rope.

4. Apparatus for measuring the length of movement of spiral wound wire rope in either direction comprising:
  (a) three radio frequency proximity sensor probes adapted to be located adjacent the wire rope along the direction of movement of the wire rope, with adjacent pairs of the sensors being spaced approximately 5/4 times the spacing between successive lays of the spiral windings of the wire rope or 2/4 additions thereto;
  (b) means for deriving an electric signal from each proximity sensor probe having a magnitude that is representative of the distance between the sensor probe and the adjacent portion of the wire rope;
  (c) means for subtracting pairs of said electric signals from one another to provide a pair of alternating current signals that are free from any low frequency or direct current component caused by changes in the distance from the sensors to the outermost diameter of the wire rope or caused by changes in the temperature of the proximity sensor probes;
  (d) filter means for removing unwanted signals caused by cross-talk between the radio frequency sensors;
  (e) means responsive to each of said alternating current signals for converting them to square wave signals; and
  (f) means responsive to said square wave signals for comparing their phase to determine the direction of movement of the wire rope, and
  (g) means responsive to said square wave signals for providing a count of the number of lays of the spiral windings of the wire rope that move in either direction along the proximity sensor probes.

5. Apparatus for measuring the depth in a well of equipment that is moved upwardly or downwardly by a spiral wound wire rope which extends between a drawworks and a derrick, comprising:
  (a) three proximity sensors located adjacent the wire rope at a position between the drawworks and the derrick and pivoted to accommodate lateral movement of the wire rope as it is spooled from side to side along the drawworks;
  (b) means for deriving electric signals from each proximity sensor having a magnitude that is representative of the distance between the sensor and the adjacent spiral portion of the wire rope;
  (c) means for comparing the phase of pairs of said electric signals to determine the direction of movement of the wire rope; and
  (d) means for counting the changes in magnitude of at least one of said electric signals to determine the length of movement of the wire rope.

6. The apparatus of claim 5 further including means for compensating for errors in measurement caused by the pivoting of the proximity sensors to accommodate said lateral movement of the wire rope.

7. The apparatus of claim 5 wherein the spacing between adjacent pairs of the proximity sensors is approximately 5/4 or half wave multiplies thereof times the spacing between the spiral windings of the wire rope.

8. Apparatus for measuring the depth in a well of equipment which is moved upwardly or downwardly by a spiral wound wire rope which extends between a drawworks and a derrick, comprising:
  (a) a plurality of proximity sensors located adjacent the wire rope;
  (b) means for deriving electric signals from each proximity sensor having a magnitude that is representative of the distance between the sensor and the adjacent spiral portion of the wire rope;
  (c) means for comparing the phase of pairs of said electric signals to determine the direction of movement of the wire rope; and
  (d) means for counting the changes in magnitude of at least one of said electric signals to determine the length of movement of the wire rope.

9. In a method for measuring the length of movement of spiral wound wire rope, the steps comprising:
  (a) positioning three proximity sensors adjacent the wire rope and spaced along the direction of movement of the wire rope to produce signals in response to movement of the spiral windings of the wire rope that are of different phase with respect to one another;
  (b) subtracting two pairs of said electric signals from one another to provide a pair of alternating current signals that are free from any low frequency or direct current component caused by changes in the distance from the sensors to the outermost diameter of the wire rope; and
  (c) deriving from said pair of electric signals a digital indication of the length and direction of movement of the wire rope.

10. In a method for measuring the depth in a well of equipment carried by a drill string which conducts the drilling operation in increments having a predetermined length and which is moved upwardly or downwardly by a spiral wound wire rope which extends between a drawworks and a derrick, the steps comprising:
  (a) positioning three proximity sensors adjacent the wire rope with adjacent pairs of the sensors being spaced to produce signals in response to movement of the spiral windings of the wire rope that are of different phase with respect to one another;

(b) pivoting the proximity sensors adjacent the wire rope at a location between the drawworks and the derrick to accommodate lateral movement of the wire rope as it is spooled from side to side along the drawworks;

(c) causing the movement of proximity sensors to accommodate lateral movement of the wire rope to be along a substantially horizontal line to thereby compensate for errors that would otherwise result from said lateral movement of the wire rope; and (d) deriving electric signals from the proximity sensors representative of the direction and length of movement of the wire rope during increments of the drilling operation.

11. In a method for measuring the depth in a well of equipment which is moved upwardly or downwardly by a spiral wound wire rope which extends between a drawworks and a derrick, the steps comprising:

(a) positioning three proximity sensors adjacent the wire rope and spaced along the direction of movement of the wire rope at a location between the drawworks and the derrick;

(b) deriving electric signals from the proximity sensors having magnitudes representative of the distance between the respective proximity sensors and the spiral windings of the wire rope;

(c) comparing the phase of said electric signals to determine the direction of movement of the wire rope; and (d) determining the length of movement of the wire rope by counting the changes in magnitude of at least one of said electric signals.

* * * * *